INVENTORS.
WILLIAM C. EXLINE
CLARENCE S. KENWORTHY
BY & WILLARD L. WARNER

Fishburn and Gold
ATTORNEYS

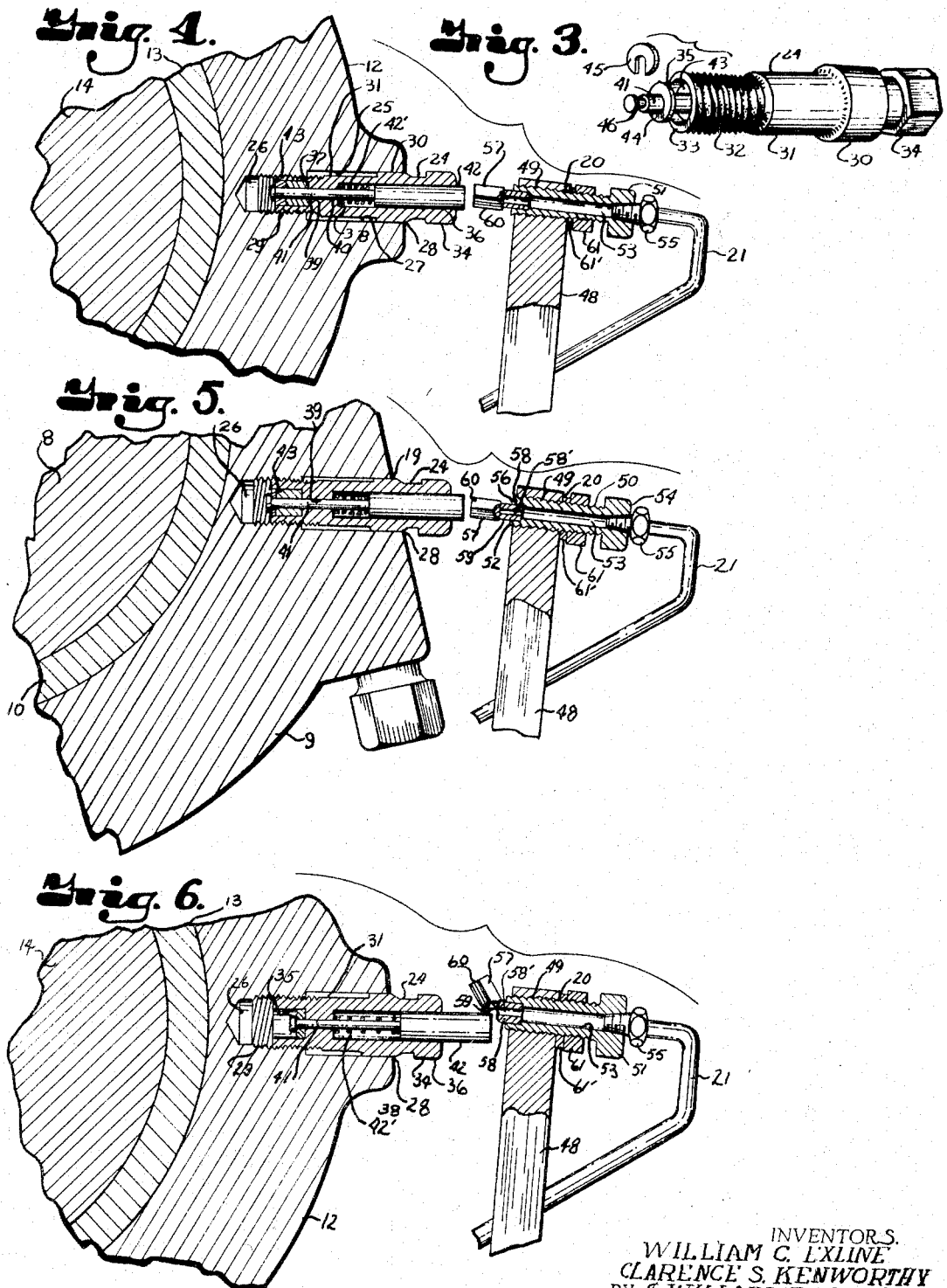

INVENTORS.
WILLIAM C. EXLINE
CLARENCE S. KENWORTHY
BY & WILLARD E. WARNER

Fishburn and Gold
ATTORNEYS

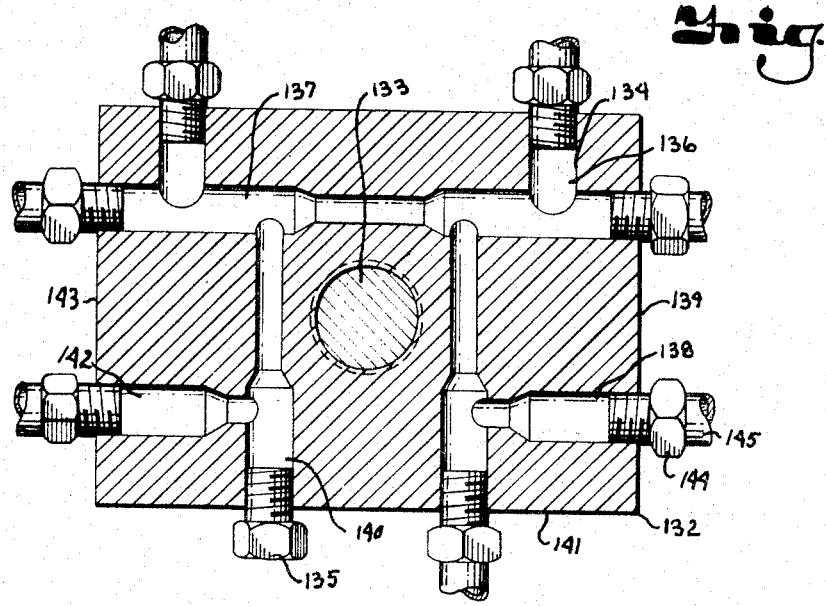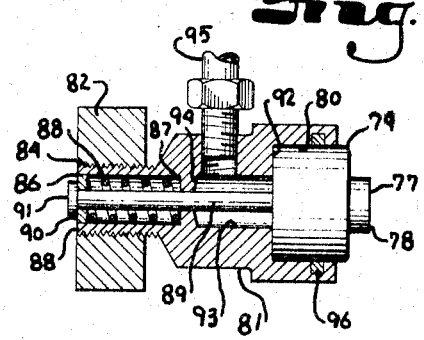

United States Patent Office 3,442,260
Patented May 6, 1969

3,442,260
TEMPERATURE-RESPONSIVE APPARATUS FOR PRESSURE FLUID POWER SHUT-OFF SYSTEMS FOR ENGINES, COMPRESSORS AND THE LIKE
William C. Exline, Salina, Kans., Clarence S. Kenworthy, Evanston, Ill., and Willard E. Warner, Hooker, Okla., assignors to Exline, Inc., Salina, Kans., a corporation of Kansas
Continuation-in-part of application Ser. No. 312,614, Sept. 30, 1963. This application Jan. 11, 1967, Ser. No. 608,565
Int. Cl. F02b 77/00; F22b 37/47
U.S. Cl. 123—198
11 Claims

ABSTRACT OF THE DISCLOSURE

A temperature responsive structure in operating mechanisms having moving portions such as engine connecting rods wherein the temperature responsive device includes a fusible element retaining an actuating structure in a normal operating position. A power shut-down apparatus using a fluid pressure system and having a breakable closure positioned adjacent the path of the movable member whereby breaking of said closure will permit a change of pressure resulting in shutting down the power for the mechanism. A plunger movable in a body positioned on the movable member is arranged to pass by the breakable closure with clearance, and upon release of the plunger by fusing of the fusible element the plunger extends whereby in its path it strikes a breakable closure for change of pressure in the power shut-down apparatus. The temperature responsive apparatus is connected in a fluid pressure system such as a pressure lubrication system with valves whereby fusing of the fusible element moves the valves to apply the oil pressure to the plunger to effect extension thereof.

---

This invention relates to temperature-respective devices particularly useful in connection with operating mechanism that may become damaged by overheating to signal or initiate stopping of the mechanism, and more particularly to temperature-responsive devices for pressure fluid power shut-off or signal systems for engines, compressors and the like in which a differential fluid pressure with the atmosphere is maintained in a closed system including a power shut-off means which is actuated by opening the system for release of said differential pressure. The present application is a continuation in part of our copending application, Ser. No. 312,614, filed Sept. 30, 1963 and now Letters Patent No. 3,338,255, issued Aug. 29, 1967.

Power shutdown apparatus using a fluid pressure system have had various arrangements for being actuated in response to excessive or overheating in the bearings and the like that are supported by stationary members, however, with moving members such as the bearings between connecting rods and crank pins, piston rods and the like, have presented substantial difficulties and heretofore have not had adequate protection. Structures have been used wherein trigger mechanisms have been connected to moving members such as connecting rods of engines whereby they move by the closure of the fluid pressure system and alternation of the path or orbit of movement, as for example, by the failure of a bearing, will result in the trigger striking the closure to break or otherwise effect opening of the system for escape of the pressure therein and shut down of the power. However, in such structure the bearing fails before the power shutdown is actuated so while the shutdown would save other parts of the engine, it has failed to give protection to the particular bearing.

The principal objects of the present invention are to provide a temperature-responsive apparatus with connections and arrangements for sensing overheating of bearings in moving members for signaling or initiating the stopping of the mechanism and thereby overcoming the above mentioned deficiencies of prior structures; to provide a power shut-off actuating apparatus wherein a fluid pressure line has a terminal with a breakable closure positioned adjacent a path of a moveable member of the mechanism with a temperature-responsive apparatus mounted in said member and a striker member held in a retracted position which is released in response to fusing or release by fusible member to move to an extended position at which in the path of movement of said moveable member the striker will strike the breakable end and open the pressure line; to provide such a structure wherein the temperature-responsive apparatus is mounted in the cavity of the moveable member with the fusible member adjacent a bearing member to be fully responsive to the temperature thereof; to provide such a structure wherein a temperature-responsive apparatus has a spring biased member retained inactive by the fusible member and which upon release moves to effect extension of the striker member; to provide such a structure wherein the temperature-responsive member is remote from the striker member and actuates a force transmitting media to move the striker member; to provide such a structure wherein a plurality of temperature-responsive members are connected for operating a single striker in response to excessive heat sensed by any one of said temperature-responsive members to thereby effect shutdown of the mechanism; and to provide a temperature-responsive apparatus for pressure fluid power shut-off systems that are economical to manufacture, capable of being installed on moveable members, and that are efficient and positive in operation for releasing the pressure for operation of the power shut-off in response to predetermined temperatures in the respective protected areas, said temperature-responsive apparatus having a respective fusible element with a narrow range of temperature for the fusing of said element.

Other objects and advantages of this invention will become apparent from the following description taken in connection with the accompanying drawings wherein are set forth by way of illustration and example certain embodiments of this invention.

FIG. 3 is a disassembled perspective view of the temperature-responsive apparatus adapted to be mounted in a moveable member.

FIG. 4 is an enlarged sectional view through the compressor connecting rod and crank pin bearing with a striker plunger retracted, and a fluid pressure system terminal supported in the path of the striker piston when released.

FIG. 5 is an enlarged sectional view showing a temperature-responsive apparatus and fluid pressure system terminal mounted in the engine connecting rods.

FIG. 6 is a sectional view similar to FIG. 5 with the striker piston released and extended and breaking the end from the fluid pressure terminal.

FIG. 7 is a fragmentary transverse sectional view through an engine-compressor structure having an articulated connecting rod and showing a modified form of temperature responsive apparatus with a plurality of temperature sensors in different sensitive positions.

FIG. 8 is a fragmentary elevational view of crank shaft and articulated connected rod particularly showing the actuating fluid connections for the temperature sensors and a striker on said connecting rod.

FIG. 9 is an enlarged sectional view through an actuating fluid manifold showing the communicating passages therein.

FIG. 10 is a partial longitudinal sectional view through the striker assembly.

FIG. 11 is an enlarged sectional view showing a temperature sensor structure and fluid pressure terminal mounted in a control portion of the connecting rod.

Figure 1:
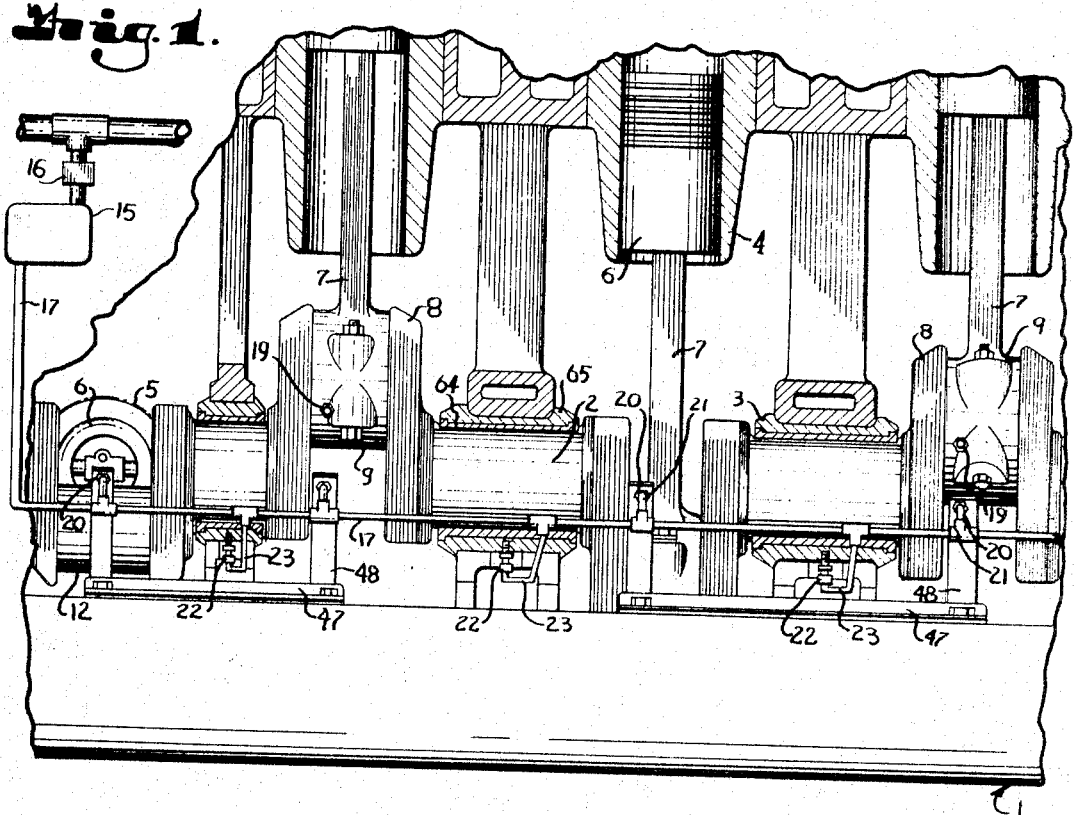
FIG. 1 is a side view partially in section of an engine compressor with the invention associated therewith.

Referring more in detail to the drawings:

The reference numeral 1 generally designates an operating mechanism such as a portion of the crank case of an engine an compressor having a crank shaft 2 journalled in main bearings 3, said engine having power cylinders 4 and compressor cylinders 5, each cooled in the conventional manner. The engine cylinders have pistons 6 connected by conventional connecting rods 7 with crank pins or throws 8 of the crank shaft. The connecting rods 7 are provided with cap bearing members 9 embracing the crank pin and having a bearing or bushing member 10 providing the bearing engagement with the crank pin. In the structure illustrated, the engine cylinders 4 are arranged in vertical position and the compressor cylinders 5 in horizontal position. The compressor cylinders have connecting rods 11 with the cap portion 12 having a bearing or bushing member 13 arranged to embrace and provide bearing engagement with the respective crank pin 14.

The engine-compressor or mechanism 1 has a power control 15 with power shut-off or signal mechanism 16 and a closed fluid pressure system including lines 17 having a pressure differential with the atmosphere arranged whereby said pressure differential retains the actuating mechanism 16 in inoperative position and release of the pressure differential, as by opening the line 17, releases the actuating mechanism to shut down the power, give a signal, or both. The power shut-off mechanism member 16 may be of any conventional type, and it may operate with a vacuum or subatmospheric pressure in the line 17, or it may be arranged whereby the actuating member 16 is held inoperative by super-atmospheric pressure of either liquid or gas, as for example, 25 pounds per square inch pressure in said line 17. The mechanism, such as an engine and compressor, has a plurality of bearings, points and areas in which the operation subjects them to heat, and temperatures above a predetermined safe maximum may be dangerous whereby continued operation of the mechanism may result in failures of the parts or other expensive damage to the mechanism. Each of the points or areas may have different safe maximum temperatures wherein a temperature-responsive apparatus arranged in the respective locations should respond to the predetermined temperature selected therefor at which the power should be shut off. Even though there are a plurality of temperature-responsive apparatuses and locations, the pressure system has the lines 17 all communicating whereby each of the pressure-responsive apparatuses are connected or arranged to effect a single closed system whereby an excessive temperature at any of the locations will result in opening of the system and the actuating element effecting shutdown of the power.

Figure 2:
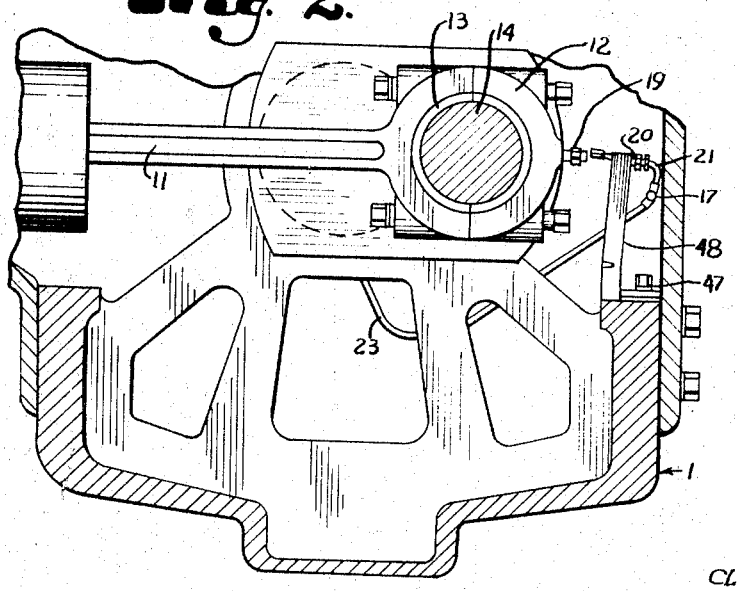
FIG. 2 is a partial transverse sectional view through the compressor portion and showing the temperature-responsive apparatus mounted to be responsive to the temperature of the crank pin bearing.

In the structure illustrated in FIGS. 1 and 2, a pressure-responsive apparatus 19 is arranged on the connecting rod of the compressor cylinder and associated with a terminal 20 of the pressure system 15. Also, temperature-responsive apparatus 19 of the same structure is mounted in the engine connecting rods and associated with terminals 20, the positions, however, varying due to the difference in the orientation of the compressor and engine cylinders. However, each of the terminals 20 are connected by a duct or pipe 21 which is a branch of and communicates with the pressure pipe 17 of the system 15. A pressure-responsive apparatus 22 is arranged at other heat-sensitive stationary points with each of said apparatus connected by a respective duct 23 which is a branch of and communicates with the main pressure line 17.

The heat-responsive apparatus 19 includes a body member 24 adapted to be secured in a socket 25 that extends into a connecting rod or cap to or adjacent to the bearing member 13 whereby any heat therefrom will be immediately effective in the inner portion 26 of the cavity. In the structure illustrated, the outer portion 27 of the cavity is formed by a cylindrical bore that extends inwardly from an outer opening 28 and terminates in a reduced bore with internal screw threads 29. The body 24 has a cylindrical portion 30 substantially of the size of the bore 27 adjacent the opening 28 whereby when positioned in the cavity the body is supported by said walls of the cavity. Inwardly of the portion 30, the body has a reduced portion 31 terminating in an externally threaded portion 32 adjacent the inner end 33. Outwardly of the portion 30 adjacent the outer end is a portion 34 having an external polygonal shape whereby when the body is positioned in the cavity it may be rotated to screw the externally threaded portion 32 into the threads 29 to secure the body in said cavity. The body 24 has bores 35 and 36 extending from the inner and outer ends respectively axially of the body, said bores terminating in shoulders 37 and 38 respectively that are spaced apart to define a wall portion 39 therebetween having an axial bore 40 of reduced size to slidably mount a stem 41 of a striker plunger member 42. The striker plunger portion slidably fits in the bore 36 and has the stem 41 extending therefrom in the bore 40 and into the bore 35. A spring 42' is sleeved on the stem 41 between the plunger 42 and the inner end of the bore 35 to bias the plunger 42 outwardly of the body 24.

The plunger 42 is normally retained in retracted position by the engagement of the inner portion of the stem 41 with a structure including a fusible metal member or element 43, a washer 44 and a keeper member or horseshoe washer 45. The washer 44 is sleeved on the stem 41 and then the keeper washer engages a shoulder formed by a reduced diameter 46 and the fusible member 43 is between the washer and the shoulder 37 of the bore 35 to hold the striker plunger whereby it cannot be extended from the body member until the fusible metal member 43 is melted or disintegrated. It is preferred that the washer 44 have a diameter whereby it is freely movable in the bore 35 but a close fit to cooperate with the body to enclose the fusible metal member 43. It is preferred that the body and plunger length be such that the distance between the inner end of the socket or bore which is close to the bearing bushing 13 to the fusible metal member 43 is small and substantially the entire temperature of the bearing bushing is effective on said fusible metal element.

The fusible metal element 43 is in the form of a sleeve fashioned from a soft metal allow which may include tin, lead and bismuth or other low melting alloys compounded whereby it will melt at a predetermined temperature and preferably with a small range between the softening temperature and the melting temperature. Applicant prefers to use an alloy sold under the trademark "Cerro" by Cerro De Pasco Sales Corp., 300 Park Ave., New York, N.Y., which is available in compositions for substantially any selected melting points between 140 degrees F. and 500 degrees F. Also, this metal is such that when it fuses it substantially disintegrates into very fine particles and thereby, on cooling, does not form chunks of metal that could cause damage to the machine structure.

As the mechanism is operated and the crank shaft rotates, the portion of the connecting rod connected to the crank pin moves in an orbit with the body 24 and the striker plunger 42 positioned as illustrated in FIG. 4, and the plunger 42 extends outwardly with the end portion moving in a defined orbital path. The power shut-off fluid pressure line 17 with the terminal 20 is arranged adjacent to said path. In the structure illustrated, the terminals 20 are supported on brackets 47 mounted in the crank case with each having a post 48 extending upwardly substantially in the plane of the orbital path of the plunger but spaced outwardly therefrom. The upper end of the post 48 has a threaded bore 49 extending toward said path and the terminal 20 in the illustrated structure includes a body 50 having a polygonal shaped end 51 with an externally threaded portion 52 extending therefrom. The body has a through bore 53 with one end threaded as at 54 to receive a fitting 55 connecting the pressure line branch 21 thereto. The other end of the body has a counterbore 56 which receives an end closure 57. The closure 57 consists of a plug-like member 58 with a hollow portion 58' sleeved into the counterbore 56 and sweated into place to form a sealed connection. Adjacent to but exteriorly to the end of the body at the counterbore, the plug member 58 has a reduced diameter formed by a groove 59 to cooperate with the hollow structure to form a wall thickness that is thin whereby the outer end portion 60 of the plug 58 may be broken therefrom by a lateral blow. The plug 58 is smaller in diameter than the threaded portion of the body and, therefore, in mounting the terminal 20 a nut 61 is threaded on the body 50 and a lock washer 61' sleeved thereon and then with the plug 58 secured in place the body 50 is screwed into the threaded bore 49 until the end 60 of the plug 58 is adjacent to the outer end of the striker plunger 42 to provide clearance in normal operation but arranged whereby when the fusible element 43 fuses and the striker plunger moves outwardly of the body 24 to the limit by the washer 44 engaging the shoulder 37 of the bore 35, the striker plunger 42 will strike the plug 58 and break the end 60 therefrom, as illustrated in FIG. 6. When the terminal 20 is in proper position, the nut 61 is threaded to engage the lock washer 61' with the post 48 to lock the body of the terminal in the selected position. The branch 21 is then connected to the body by the fitting 55 so that in operation with pressure in the fluid pressure power shut-off, the breaking of the end 60 from the terminal will open the interior of the fluid pressure system to the atmosphere so that the control pressure differential is eliminated and the actuating element is then actuated to shut off the power.

With the structure wherein the portion of the body at the threaded end 29 and the washer 44 substantially enclose the fusible element 43, the entire element is substantially subjected to the same temperature so that upon a rise in temperature in the bearing bushing 13 the element does not give way until it melts. This provides an insulation or protection to the fusible element whereby small portions thereof are not subjected to higher temperatures than other portions which might result in a softening of only a portion and thereby a partial release to where the plunger 42 would strike the terminal end 60 when the bearing temperature was actually below that at which the shutdown was desired. The enclosing or protection of the fusible element prevents such partial melting and assures that the entire fusible element is subjected to the same temperature so that when melting occurs the entire element melts.

In the structure illustrated in FIG. 5, the temperature-responsive device 19 is mounted in the bearing cap 9 of the connecting rod 8 and, due to the vertical arrangement of the cylinders 4, it is found desirable to arrange the temperature-responsive device 19 so that it is in a side of the bearing cap 9 as this permits the positioning of the post 48 of the bracket 47 to carry the terminal in a similar position to that used for the terminal for the compressor connecting rod assembly. Other than relative position, the structure illustrated in FIG. 5 is the same as that shown in FIG. 4 and operates in the same manner to provide a temperature-responsive protecting arrangement for the bearing in the connecting rod that engages the crank pin. While it is preferred to arrange the terminal end 20 so it is adjustable in the post 48, it is to be understood that it could be fixed relative to the post and the connection of the post to the crank case be made adjustable. Also, the post may be arranged at desired angles, as illustrated in FIG. 2, for the most advantageous positioning of the end 60 to receive a lateral impact to break same when the fusible element 43 is fused and the striking plunger moves outwardly in response to temperatures over a predetermined desired maximum which corresponds to the melting temperature of the fusible element.

In the form of the invention illustrated in FIGS. 7 to 11, inclusive, the engine-compressor structure generally designated with the reference numeral 65, has a crank shaft 66 with a crank pin 67 on which is mounted an articulated connecting rod assembly 68 having bearing portions 69 and a cap 70 embracing the crank pin with a bearing or bushing member 71 providing the bearing engagement with the crank pin. The articulated rod has a portion 72 integral with the bearing portion 69 and extending therefrom for connection in the usual manner with a compressor piston (not shown). As in conventional engine-compressor structures using articulated connecting rods, the bearing portion 69 has pairs of spaced ears 73 each of which have bores with bearing members 74 for mounting pins 75 to which are connected connecting rods 76 that extend therefrom and have other ends connected to engine piston (not shown).

The engine-compressor structure 65 preferably has the same signal mechanism 16 and closed fluid pressure system including lines 17 having a pressure differential with the atmosphere as illustrated and described in the structure shown in FIGS. 1 and 2. As illustrated in FIG. 7, the power shut-off fluid pressure through line 17 is connected by a duct or pipe 21 which communicates the pressure pipes 17 with a terminal 20 suitably supported in the orbital path of the striker plunger or piston 77 which is suitably mounted on and extends outwardly from the connecting rod cap portion 70. The terminal 20 for the corresponding connecting rod assembly 68 is supported on a bracket 47 mounted in the crank case wherein the post 48 thereof extends substantially upwardly in the plane of the orbital path of the plunger 77 and spaced outwardly therefrom. The upper end of the post 48 mounts the terminal 20 whereby the closure plug 57 extends toward the connecting rod assembly and the end 60 of said closure plug is adjacent to the outer end of the striker plunger 77 to provide clearance in normal operation and arranged whereby when the striker plunger moves outwardly relative to the connecting rod the striker plunger will strike the closure plug 57, break the end 60 therefrom and open the interior of the fluid pressure system to the atmosphere so the control pressure differential is eliminated and the actuating element is actuated to shut off the power.

In the structure illustrated the sriker plunger 77 has an end portion 78 on a piston head 79 that slidably fits in a bore 80 of a body member 81. The body member may be mounted in any suitable manner onto the connecting rod structure, however, in the illustrated structure a bar 82 is secured to the connecting rod cap 70 by suitable fastening devices 83, said bar having a threaded bore 84 into which a reduced threaded end 85 of the body is screwed. A bore 86 extends from the threaded end longitudinally of the body and terminates in a shoulder 87 whereby a spring 88 is positioned in the bore 86 in surrounding relation to a stem 89 of the plunger 77 said stem being slidable in a bore 89'. One end of the spring 88 engages the shoulder 87 and the other end a washer 90 which abuts a small headed end 91 of the stem to urge the plunger rearwardly whereby the piston head engages a shoulder 92 to limit retractive movement of the plunger by the spring 88. The body 81 has a counterbore 93 extending inwardly from the shoulder 92 and terminating as at 94. A fluid pressure connection 95 is mounted on the body 81 and communicates with the bore 93 for applying fluid pressure to said bore and the piston head as later described to overcome the spring 88 and force the piston outwardly whereby the end 78 will strike the end 60 of the terminal 20 on the next orbit of the connecting rod. A seal member 96 is mounted in the body to sealingly engage the piston head to prevent fluid leakage therearound.

In the structure illustrated in FIGS. 7 to 11, inclusive, there are a plurality of sensitive areas wherein rising temperature indicates a dangerous condition necessitating the shut down of the engine-compressor and the structure is arranged whereby a predetermined temperature in any one of the sensitive areas will result in fluid pressure being applied through the connection 95 to the striker piston to force same outwardly whereby the end 60 of the terminal 20 is broken.

In the structure illustrated in FIGS. 7 to 11, inclusive, sor structures 98 located on the connecting rod adjacent each end of the cap structure 70 as at 99 and 100 to sense the temperature of the bearing member 71. Additional sensors may be arranged as desired as for example, upon the ears 73 as at 101 and 102, for each end bearing 74. The temperature sensor or responsive structure 98 as illustrated in FIG. 11 is substantially the same structure for installation in each of the temperature sensing locations and capable of being mounted in any location on the connecting rod portion 72 including the other end thereof to sense the bearing of the piston pin (not shown). Also they are similar to the heat responsive apparatus 19 except that they are remote from the striker plunger or piston and utilize fluid pressure for the medium of transferring the force to the striker piston intead of a direct connection.

The temperature sensor 98 as illustrated in FIG. 11 is mounted in the bearing housing or end cap 70 of the connecting rod assembly 68 to sense the temperature of the bearing 71 in which the crank pin 67 rotates. The body 104 is adapted to be secured in a socket 105 that extends into the connecting rod member 70 to or adjacent to the bearing member 71 whereby any heat therefrom will be immediately effective in the inner portion of the socket cavity. In the structure illustrated the body 104 has an externally threaded portion 107 adjacent the inner end 108 which threaded end is screwed into the internally threaded socket 105 to mount the body therein. The body 104 has bores 109 and 110 extending from the inner and outer ends respectively axially of the body, said bores terminating in shoulders 111 and 112 respectively that are spaced apart to define a wall portion 113 therebetween having an axial bore 114 of reduced size to sizably mount a stem 115 of a plunger or piston 116. The plunger 116 has a piston head that slidably fits the bore 110 and has a seal member 117 to sealingly engage the bore. A spring 118 is sleeved on the stem 115 and engages the piston head and the shoulder 112 to urge the plunger outwardly of the bore 110. The plunger 116 is normally retained in retracted position by the engagement of the inner portion of the stem 115 with a structure including a fusible metal member or element 119, a washer 120 and a keeper member 121 of horseshoe shape. The washer 120 is sleeved on the stem 115 and then the keeper member engages a shoulder formed by a reduced diameter 122 with the fusible element 119 between the washer 120 and the shoulder 111 of the bore 109 to hold the plunger whereby it cannot be moved toward the outer end of the body until the fusible element or member 119 is melted or disintegrated. It is preferable that the washer 120 have a diameter whereby it is freely movable in the bore 109 but a close fit to cooperate with the body to enclose the fusible member 119. It is preferable that the body and plunger length be such that the distance between the inner end of the socket and the bearing member 71 to the fusible metal member 119 is small and substantially the entire temperature of the bearing member is effective on said fusible metal element.

The body member 104 is provided with a connection 123 to a source of fluid pressure, the connection extending into and communicating with the bore 110 adjacent the shoulder 112 to supply and maintain fluid pressure in said bore between the shoulder 112 and the piston 116. The bore is provided with a second connection 124 positioned where communication thereof with the bore 110 is closed by the piston 116 and when the fusible metal member 119 is melted or disintegrated the piston 116 moves outwardly with the inner end 125 of said piston moving past the port 126 of the connection 124 effecting communication of fluid pressure from the connection 123 to the connection 124. The source of fluid pressure to the connection 123 may be any suitable pressure source, however, in engine-compressor structures force free lubrication through bores 127 in the crank shaft to the bearings is common practice. Also, such lubrication is transmitted through the crank pin bores to bores in the connecting rod or tubes 128 leading to the piston pin bearing (not shown). In the structure illustrated the connection 123 has communication with tubes 129 that have a source of fluid pressure from the piston pin bearing and through such tubes and fittings 130 such as T's, the fluid pressure is transmitted to each of the connections 123 of the respective temperature sensing members 98.

In order that each of the temperature sensors 98 be able to actuate the striker piston 79 in the event of melting or disintegrating of a respective fusible metal element, the connection 95 of the striker has communication through a tube 131 to a manifold block 132. In the illustrated structure, the manifold block 132 is secured to the cap 70 by a suitable fastening device 133 and said block has a plurality of threaded apertures 134 spaced therearound and communicating with bores whereby each aperture has communication through the bores with the others thereby providing for connection of a plurality of fluid lines from temperature sensors 98 and any excess of apertures may be plugged by a suitable closure as at 135. In the structure illustrated the block has two aligned bores 136 extending from opposite sides and connected at the inner end with a transverse bore 137. The bores 136 also are connected in their intermediate ends with other transverse bores 138 leading to the top face 139. Other bores 140 extend inwardly from the faces 141 and in opposed relation and communicate at their inner ends with transverse bores 142 which extend from the face 143 to and communicate with the bores 136. Each of the threaded apertures 134 are adapted to receive connectors 144 for pipes or tubes 145 that extend to a respective connector 124 with a respective temperature sensor 98.

In the operation of such a structure with each of the temperature sensors 98 mounted in sensing relation to a temperature critical area such a bearing or the like and with the fusible elements 119 in place and each of the temperature sensors connected by their respective connectors 123 with a fluid pressure line 129 whereby fluid pressure is in the bore 110 of each temperature sensor between the shoulder 112 and the piston 116 and the temperature sensors each connected through tubes 145 with the manifold 132 which is in turn connected through the tube 131 with the striker structure, the crank shaft rotates and the portion of the connecting rod 68 connected to the crank pin 67 moves in an orbit with the striker plunger 77 positioned as illustrated in FIGS. 7 and 10. The power shut off fluid pressure line 17 is connected with the terminal 20 which is arranged adjacent to the path of the outer end of the striker plunger 77. It is spaced outwardly therefrom so as to have a clearance during normal operation. Normally the flow lines and passages from the striker body through the manifold block to the connections 124 to the temperature sensors 98 is a closed system, and the spring 88 will hold the striker plunger 77 in its retracted position. In the event the temperature of a sensed bearing or a point increases to a predetermined temperature at which the respective fusible element 119 melts or disintegrates the respective piston is released for movement outwardly in the body 104 under urging of the spring 118. When the piston moves outwardly it opens communication from the bore of the body whereby the fluid pressure from the source can flow through the connection 123, bore 110, port 126, connection 124 to the manifold 132 and through the passages leading to the tube 131 whereby said fluid pressure is effective in the bore 93 of the striker body to overcome the spring 88 forcing the plunger 77 outwardly whereby the plunger will strike the plug and break the end 60 therefrom on the next orbit of the striker as the crank shaft is rotated. The breaking of the end 60 from the terminal 20 releases the fluid pressure therein to the atmosphere so the control pressure differential is eliminated and the control shuts off the power.

It is to be understood that the melting point of the fusible elements may be selected so each fusible element used will be the particular melting point desired to protect a respective temperature sensitive area. Also, if it is desirable to have two temperature control responsive systems on the mechanism to be protected, in one system the melting of the fusible material would release the system whereby the control would shut down or stop the mechanism. In the other system, the temperature responsive devices would be such that the melting of the fusible element of a temperature sensor in the system would release the system whereby it would be actuated to give a signal or an alarm of the condition. This system would advise that the unit could continue to operate without serious damage but the operator should keep a close watch on it or take remedial measures if possible.

What we claim and desire to secure by Letters Patent is:

1. The combination with an operating mechanism having a movable member with a portion movable in a defined path:
    (a) a tubular body having one end closed by an end member breakable in response to a lateral blow, said tubular body having means at its other end for connection of a fluid pressure duct of a fluid pressure power shut off system,
    (b) means supporting said tubular body with said one end adjacent the defined path of said movable member portion,
    (c) a striker assembly having a body mounted on said movable member with one end projecting therefrom, said body having a bore extending from said one end,
    (d) a striker plunger slidable in said bore,
    (e) cooperating means in said striker body and on said plunger to limit outward movement of said striker plunger,
    (f) said strike body having the other end of the temperature responsive portion adjacent an area in which an excessive temperature may be dangerous to the mechanism,
    (g) said plunger having a stem extending toward said other end of the striker body and having a head thereon for limiting outward movement of the plunger,
    (h) a fusible metal member in said temperature responsive portion positioned to fuse in response to a predetermined temperature in said area, said fusible metal member being engaged between the head and the body for retaining the plunger in retracted position,
    (i) and means normally held in retracted position by said fusible metal member and having operating relationship with said striker plunger to move the striker plunger outwardly in response to fusing of said fusible member whereby the plunger strikes and breaks the breakable end member as it moves in its path thereby permitting an escape of fluid pressure from said power shut off system.

2. The combination as set forth in claim 1 wherein there is means in the striker assembly biasing the striker plunger outwardly of the bore and the body.

3. The combination as set forth in claim 2 wherein the operating mechanism is an engine having a rotatable crank shaft, a piston rod, with the movable member portion being an end of the piston rod and including a bearing connecting same to said crank shaft whereby said one end moves in an orbit during rotation of the shaft, the other end of the striker plunger body being mounted in said one end of the piston rod adjacent said bearing with the fusible metal member positioned in said body adjacent said bearing to be sensitive to the temperature thereof.

4. A combination as set forth in claim 1 wherein the fusible element is substantially surrounded by and engaged with metal for substantially equal distribution of heat to the entire fusible element.

5. The combination with an operating mechanism having a movable member with a portion movable in a defined path:
    (a) a tubular body having one end closed by an end member breakable in response to a lateral blow, said tubular body having means at its other end for connection of a fluid pressure duct of a fluid pressure power shut off system,
    (b) means supporting said tubular body with said one end adjacent the defined path of said movable member portion,
    (c) a striker assembly having a body mounted on said movable member with one end projecting therefrom, said body having a bore extending from said one end,
    (d) a striker plunger slidable in said bore,
    (e) cooperating means in said striker body and on said plunger to limit outward movement of said striker plunger,
    (f) a temperature responsive portion mounted on said movable member adjacent an area in which an excessive temperature may be dangerous to the mechanism, said temperature responsive portion including a body remote from the striker assembly and having a bore,
    (g) a piston slidable in said bore,
    (h) cooperating means in said temperature responsive portion body and connected to the piston to limit outward movement of said piston in said bore,
    (i) a fusible metal member in said temperature responsive portion to fuse in response to a predetermined temperature in said area, said fusible metal member being between said body and said cooperating means and retaining said piston in a retracted position,
    (j) means communicating a source of fluid pressure to said temperature responsive portion body to act on said piston,
    (k) and means normally held in retracted position by said fusible metal member and having operating relationship with said striker plunger to move the striker plunger outwardly in response to fusing of said fusible member whereby the plunger strikes and breaks the breakable end member as it moves in its path thereby permitting an escape of fluid pressure from said power shut off system,
    (l) means connected to said temperature responsive portion bore and normally closed by the piston therein and communicating with the striker body inwardly of said plunger, said connection with said temperature responsive portion being opened for communication with the portion body bore when the piston is moved outwardly on fusing of the fusible member whereby the fluid pressure is transmitted through the connection with the strike body to move the striker plunger outwardly to strike and break the breakable end member as the striker assembly moves in its path to permit escape of fluid pressure from the power shut off system.

6. The combination as set forth in claim 5 wherein there are a plurality of temperature responsive portions on the movable member, each sensing the temperature of a respective area with each of the temperature responsive portions supplied with fluid pressure, and a manifold arranged between the striker assembly and each of the temperature responsive portions for fluid pressure flow on the fusing of any one fusible member to the striker assembly to move the plunger therein outwardly to strike and break the breakable end member as the striker assembly moves in its path.

7. The combination with an operating mechanism having a rotatable member with a portion movable in an orbit and having parts which if overheated, may burn out or present a dangerous condition:
  (a) a member connected in a fluid pressure duct of a fluid pressure power shut off system for the mechanism with said member having a portion breakable in response to a lateral blow to permit escape of fluid pressure from said power shut off system,
  (b) means supporting said member with said breakable portion adjacent the orbital path of said rotating member portion,
  (c) a striker assembly mounted on said rotating member portion and including a body having a bore extending from one end,
  (d) a temperature responsive assembly mounted on said rotating member portion remote from the striker assembly and adjacent a heat subject area, said temperature responsive assembly including a body having one end adjacent said temperature subject area and having a bore extending from the other end,
  (e) a piston member in each of the bores of the striker assembly body and the temperature responsive assembly body and slidable therein,
  (f) a fluid pressure connection between the bodies,
  (g) means in said temperature responsive assembly operative to retain the piston therein in retracted position and operative to release said piston in response to a predetermined temperature in the respective temperature subject area for movement of said piston in the respective bore,
  (h) and means responsive to movement of the piston in the temperature responsive assembly body effecting movement of the piston in the striker assembly body,
  (i) and means on said piston in the striker assembly that is moved to a position to strike and break the said breakable portion as said rotatable member portion moves in its next orbit.

8. The combination as set forth in claim 7 wherein there is means in each body bore biasing the respective piston toward the outer end of the respective bore.

9. The combination as set forth in claim 7 wherein the operating mechanism is an engine having a rotatable crank shaft, an articulated piston rod, with the movable member portion being an end of the piston rod and including a bearing connecting same to said crank shaft whereby said one end moves in an orbit during rotation of the shaft and one end of the temperature responsive assembly body is mounted in said one end of the piston rod adjacent said bearing and the piston retaining means therein is a fusible metal member positioned in said body adjacent said bearing to be sensitive to the temperature thereof.

10. The combination as set forth in claim 9 wherein there are a plurality of temperature responsive assemblies on the piston rod each sensing the temperature of a respective area with each of the temperature responsive assembly bodies supplied with fluid pressure with a manifold arranged between the striker assembly and each of the temperature responsive assemblies for fluid pressure flow on the fusing of any one fusible member to the striker assembly to move the piston therein outwardly to strike and break the breakable member as the striker assembly moves in its path.

11. The combination with an operating mechanism having a rotatable member with a portion movable in an orbit and having parts which, if overheated, may burn out or present a dangerous condition:
  (a) a member connected in a fluid pressure duct of a fluid pressure power shut off system for the mechanism with said member having a portion breakable in response to a lateral blow to permit escape of fluid pressure from said power shut off system,
  (b) means supporting said member with said breakable portion adjacent the orbital path of said rotating member portion,
  (c) a striker assembly mounted on said rotating member portion with one end projecting therefrom, said body having a bore extending from said one end,
  (d) a striker piston slidable in said bore, cooperating means in said striker body and on said piston to limit outward movement of said striker plunger,
  (e) means in said body biasing said piston toward said one end,
  (f) a plurality of temperature responsive assemblies with each being remote from the striker assembly, each temperature responsive assembly including a body mounted in the movable portion adjacent an area in which the temperature is to be sensed, each of said temperature responsive assembly bodies having a bore,
  (g) a piston slidable in each of said assembly body bores,
  (h) cooperating means in the temperature responsive assembly bodies and connected to the respective piston to limit outward movement of said piston in the respective bore,
  (i) a fusible metal member between the respective said cooperating means and bodies retaining the respective piston in a retracted position,
  (j) means communicating a source of fluid pressure to said temperature responsive assembly bodies to act on the respective pistons,
  (k) means connected to said temperature responsive assembly bores and normally closed by the respective piston therein and communicating with the striker body inwardly of the piston therein, said connections with said temperature responsive assembly bores being open when the respective piston is moved outwardly on fusing of the fusible member whereby the fluid pressure is transmitted through the connection with the striker body to move the striker plunger outwardly to strike and break the breakable member as the striker assembly moves in its path to permit escape of fluid pressure from the power shut off system.

References Cited

UNITED STATES PATENTS

| | | | |
|---|---|---|---|
| 135,213 | 1/1873 | Evans | 308—1.5 X |
| 855,414 | 5/1907 | Rockwell. | |
| 1,058,993 | 4/1913 | Marvin | 137—72 X |
| 1,498,096 | 6/1924 | Herr. | |
| 1,675,780 | 7/1928 | Alric. | |
| 2,187,958 | 1/1940 | Vigne et al. | 308—1.5 X |
| 2,435,343 | 2/1948 | Downey. | |
| 2,502,318 | 3/1950 | Fischer. | |

(Other references on following page)

| | | | |
|---|---|---|---|
| 2,588,204 | 3/1952 | Cameron et al. | 137—72 X |
| 2,655,166 | 10/1953 | Steins et al. | 137—72 |
| 2,952,238 | 11/1960 | Barber | 308—1.5 X |

FOREIGN PATENTS

| | | |
|---|---|---|
| 611,832 | 7/1926 | France. |
| 311,909 | 11/1914 | Germany. |

JULIUS E. WEST, *Primary Examiner.*

U.S. Cl. X.R.

184—1; 122—504.1; 192—129; 308—1